(12) United States Patent
Jones et al.

(10) Patent No.: US 7,824,546 B1
(45) Date of Patent: Nov. 2, 2010

(54) CANTEEN

(76) Inventors: Sandra Saunders Jones, 4544 Minden Rd., Memphis, TN (US) 38117-2416; David Bron Eaton, 314 Wallace Rd., Memphis, TN (US) 38117-1528

( * ) Notice: Subject to any disclaimer, the term of this patent is extended or adjusted under 35 U.S.C. 154(b) by 367 days.

(21) Appl. No.: 12/151,639

(22) Filed: May 7, 2008

(51) Int. Cl.
*B01D 35/26* (2006.01)

(52) U.S. Cl. ............ 210/136; 210/244; 210/416.3; 210/453; 210/497.01

(58) Field of Classification Search .......... 210/244, 210/416.3, 136, 453, 497.07
See application file for complete search history.

(56) References Cited

U.S. PATENT DOCUMENTS

| | | | | |
|---|---|---|---|---|
| 703,654 | A | * | 7/1902 | Hall ............... 222/189.11 |
| 2,649,205 | A | * | 8/1953 | Quinn ............. 210/416.3 |
| 5,120,437 | A | * | 6/1992 | Williams ........... 210/244 |
| 5,552,046 | A | | 9/1996 | Johnston et al. |
| 6,379,544 | B1 | | 4/2002 | Chen |
| 6,569,329 | B1 | * | 5/2003 | Nohren, Jr. ......... 210/282 |
| 2009/0173673 | A1 | | 7/2009 | Pritchard |

FOREIGN PATENT DOCUMENTS

| | | |
|---|---|---|
| EP | 0445989 A2 | 9/1991 |
| GB | 2443608 A | 5/2008 |
| GB | 2443608 B | 11/2008 |

| | | |
|---|---|---|
| WO | 2006021966 A1 | 3/2006 |

OTHER PUBLICATIONS

Lifesaver Systems, internet web pages from www.lifesaversystems.com (date unknown) (16 pages), Lifesaver Systems, Ipswich, United Kingdom.
Lifesaver Systems, Lifesaver bottle—World's First all in one Ultra Filtration Water Bottle to Remove all Waterborne Pathogens Without Chemicals (Sep. 11, 2007) (2 pages), Lifesaver Systems, London, United Kingdom.
Lifesaver Systems, Lifesaver bottle—Solves Drinking Water Needs of India's Flood Victims (Feb. 16, 2008) (2 pages), Lifesaver Systems, New Delhi, India.
Lifesaver Systems, Lifesaver® bottle citi™—Mazda Kiyora Concept Car Produces Drinking Water From Rain Water With the World's First Ultra Filtration Water Bottle—conserving water as well as fuel (Oct. 1, 2008) (2 pages), Lifesaver Systems, Paris, France.
Lifesaver Systems, Lifesaver® hydrocarry™—World's First Ultra Filtration Hydration Pack to Remove all Waterborne Pathogens Instantly (Oct. 4, 2008) (2 pages), Lifesaver Systems, Washington, U.S.A.
Lifesaver Systems, Water Becomes the New Currency in Disaster Zone (Jan. 18, 2010) (1 page), Lifesaver Systems, London, United Kingdom.

(Continued)

*Primary Examiner*—Matthew O Savage
(74) *Attorney, Agent, or Firm*—Walker, McKenzie & Walker, P.C.

(57) ABSTRACT

A canteen including a reservoir for containing unfiltered water; a filter; a spout; and a pump for pumping water from the reservoir, through the filter, and then out the spout as filtered water.

3 Claims, 4 Drawing Sheets

OTHER PUBLICATIONS

Donachie, Peter, and Krahn, John, Report on Microbial Tests Carried Out for Lifesaver Systems (Dec. 17, 2007) (4 pages), London School of Hygiene & Tropical Medicine, Department of Infectious and Tropical Diseases, University of London, London, United Kingdom.

Lifesaver Systems, Lifesaver Bottle—Instruction Manual (Jul. 17, 2008) (20 pages), Lifesaver Systems, London, United Kingdom.

KX Industries, L.P., Ceramikx All-Carbon, Sub-Micron Performance (Feb. 2002) (2 pages) (KX Industries, L.P.; Orange, Connecticut, U.S.A.).

* cited by examiner

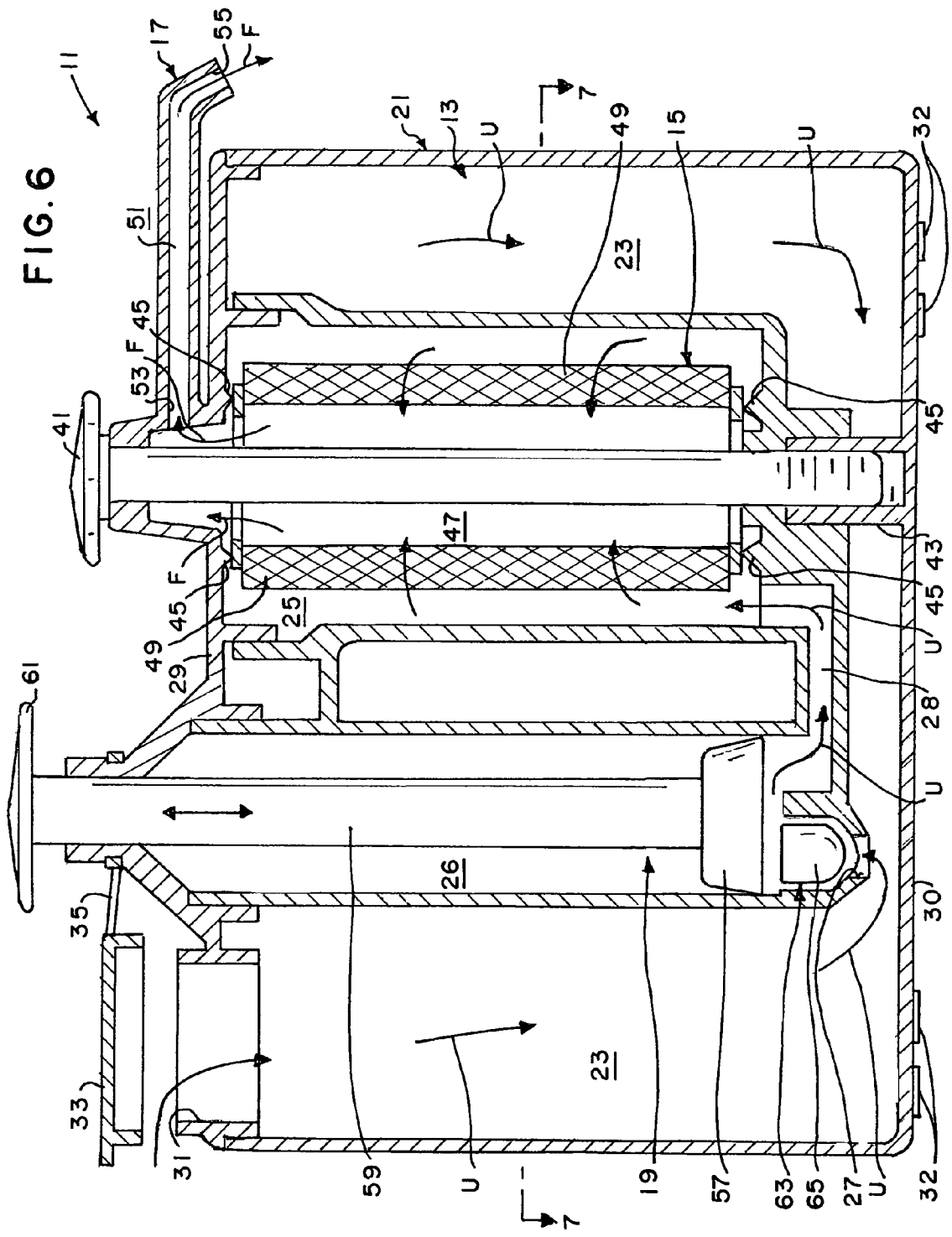

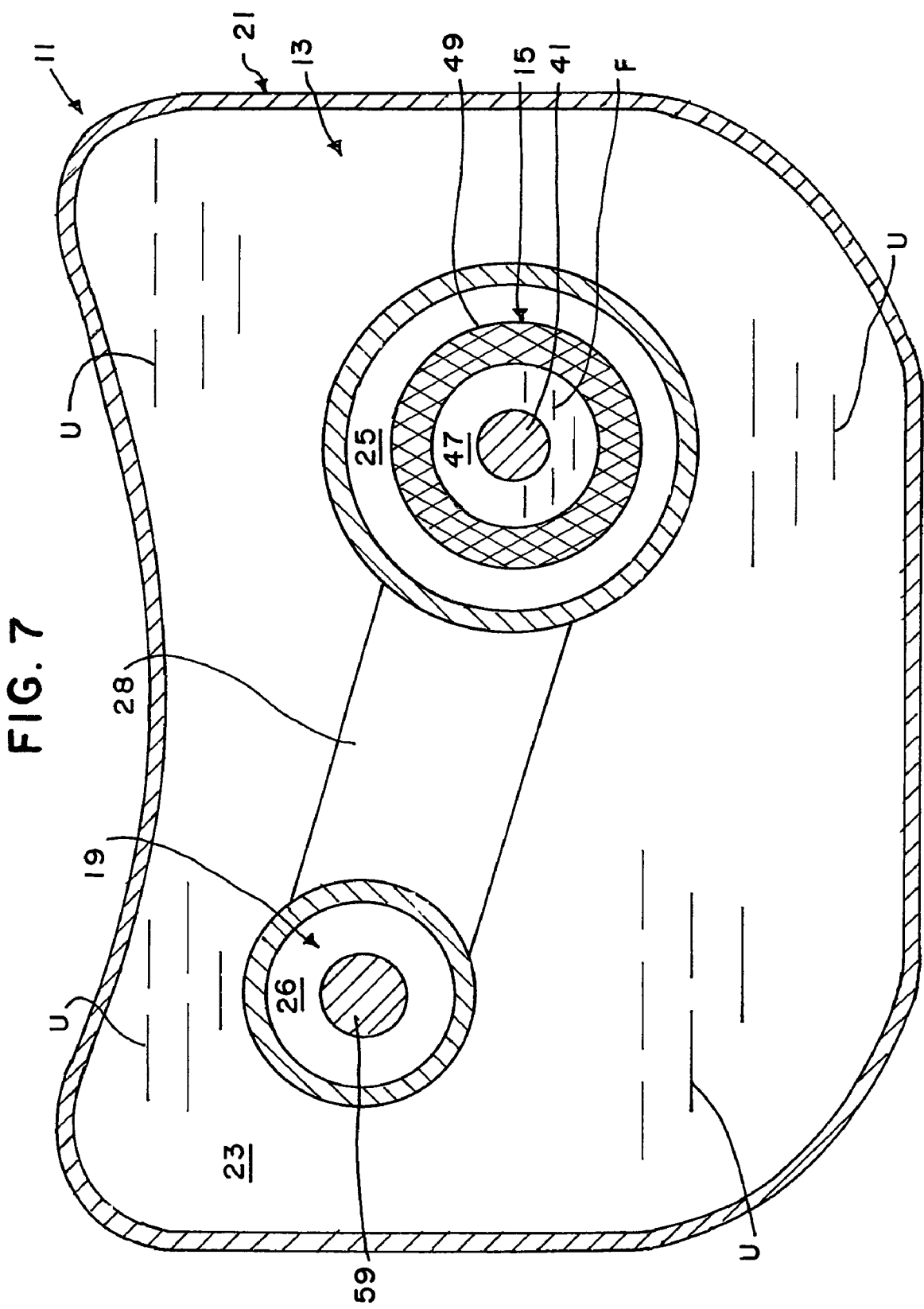

CANTEEN

BACKGROUND OF THE INVENTION

1. Field of the Invention

The present invention relates, in general, to an improved canteen, and in particular, to a canteen for carrying unfiltered liquid and for dispensing filtered liquid.

2. Background Art

Canteens, bottles, barrels, flasks, etc., have been used to carry liquids such as water away from the initial or prime source of the liquid have been used for centuries. Likewise, filters for removing contaminants from liquids such as water are well known. Such filters can be designed to remove or kill bacteria and viruses, chlorine, pesticide, organic wastes, parasite cysts, heavy metals such as lead, etc. Many companies market replaceable cartridge type water filters. For example, KX Industries, L.P., 269 South Lambert Rd., Orange, Conn. 06477-3502, markets CERAMIKX® brand cartridge filters using activated carbon particles for particulate, chlorine, and odor reduction. Units or combinations of such filters with carafes, pitchers or the like are known in which unfiltered water can be poured or otherwise forced through filters for storage as filtered water in carafes, pitchers or the like.

Nothing in the known prior art discloses or suggest a filter/reservoir combination or unit that can carry unprocessed, unfiltered water in canteen fashion for later filtration away from the initial water source.

BRIEF SUMMARY OF THE INVENTION

The present invention provides a canteen having a reservoir for containing and storing unfiltered water, a built-in filter from removing impurities and the like from the unfiltered water, a spout, and a pump for pumping water from the reservoir, through the filter, and out the spout.

One object of the present invention to provide such a unit which can carry a quantity of unfiltered, unprocessed water in canteen for later filtration and use away from the initial water source.

BRIEF DESCRIPTION OF THE SEVERAL VIEWS OF THE DRAWINGS

FIG. 6 is a diagrammatic sectional view of the canteen of the present invention, showing the working relationship between the various components thereof, with portions thereof omitted and in moved or rotated positions for clarity.

FIG. 7 is a diagrammatic sectional view of the canteen of the present invention substantially as taken on line 7-7 of FIG. 6, with portions thereof omitted and in moved or rotated positions for clarity.

DETAILED DESCRIPTION OF THE INVENTION

Figure 1:
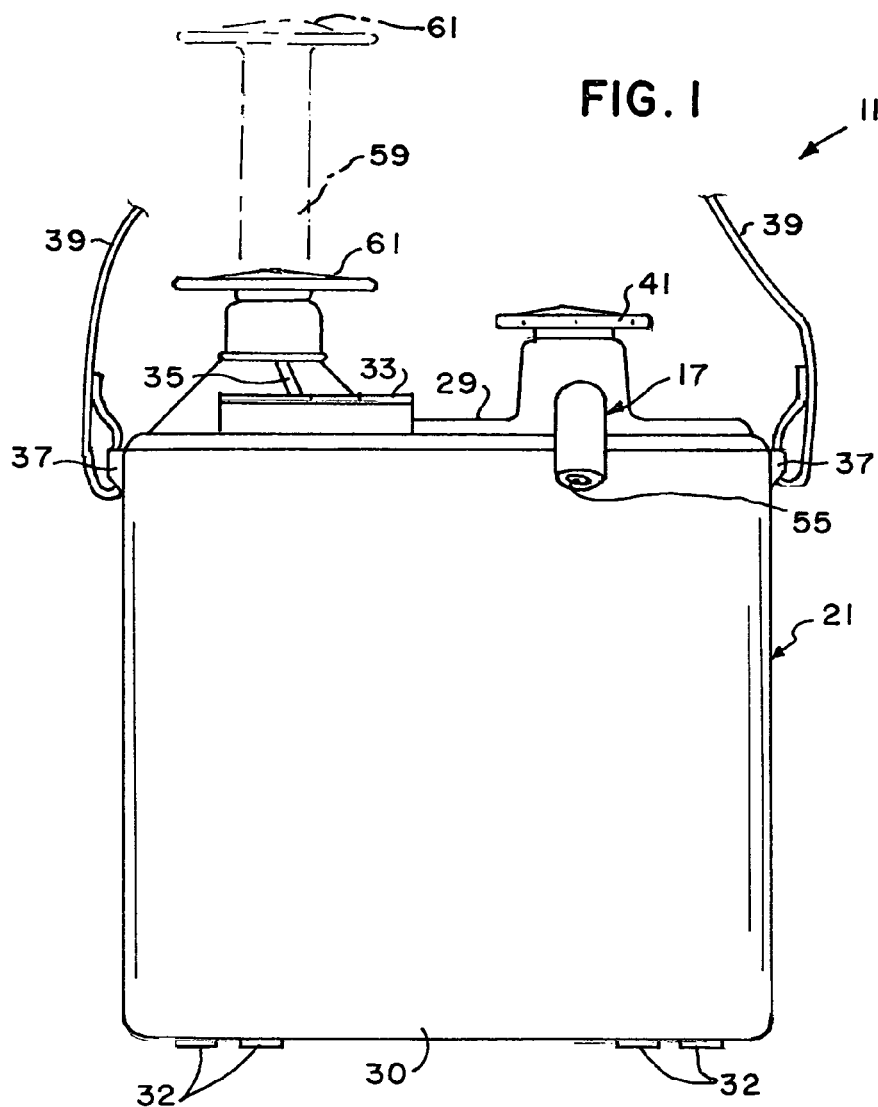
FIG. 1 is a front elevational view of the canteen of the present invention, with portions thereof broken away for clarity.
Figure 2:
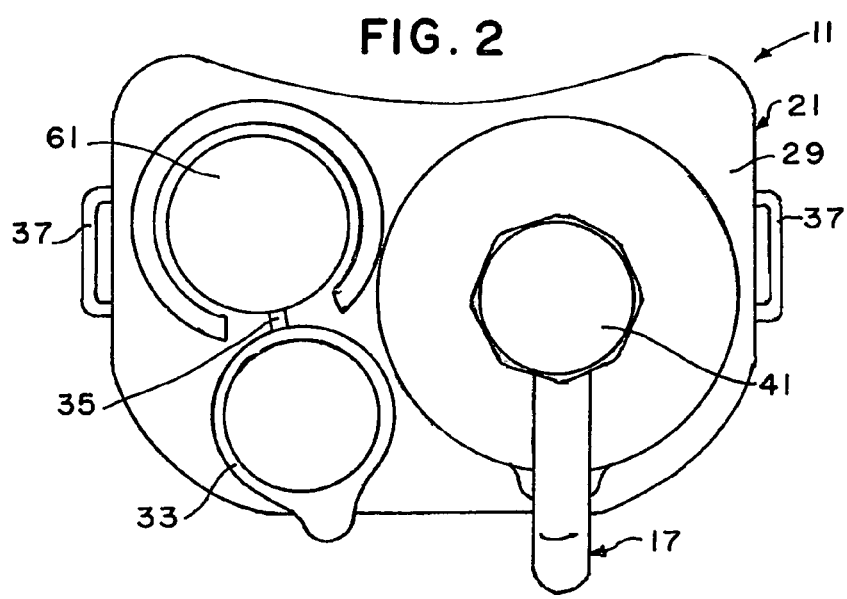
FIG. 2 is a top plan view of the canteen of the present invention, with portions thereof omitted and broken away for clarity.
Figure 3:
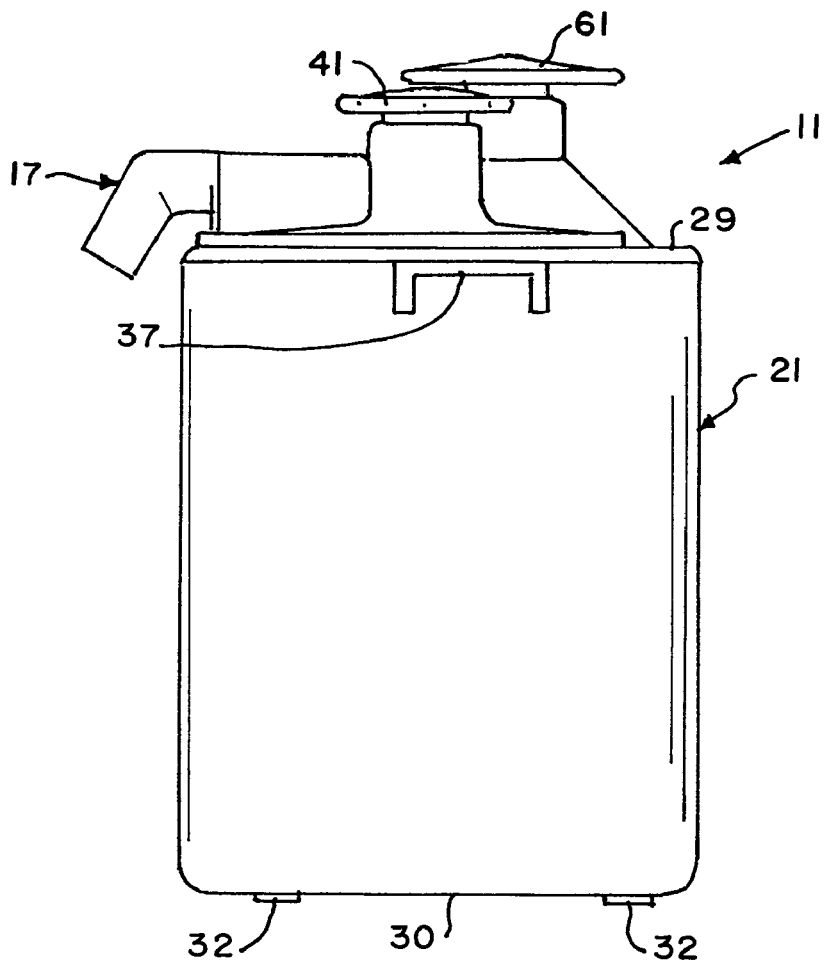
FIG. 3 is a side elevational view of the canteen of the present invention, with portions thereof omitted for clarity.

A preferred embodiment of the canteen of the present invention is shown in the drawings, and identified by the numeral 11. The canteen 11 is used for containing a quantity of unfiltered, unpurified liquid (e.g., unfiltered water U) and for dispensing filtered, purified liquid (e.g., filtered water F).

The preferred embodiment of the canteen 11 includes a reservoir 13 for containing unfiltered water U, a filter or filter media 15 for filtering the unfiltered water U, a spout 17 through which filtered water F is discharged or emitted, and a pump 19 for pumping unfiltered water U from the reservoir 13, through the filter 15, and then pumping filtered water F out the spout 17.

The canteen 11 includes a body 21 having a hollow interior 23, a filter chamber 25 located within the hollow interior 23 for the filter 15, a pump chamber 26 located within the hollow interior 23 for the pump 19, an inlet passageway 27 between the reservoir 13 and the pump chamber 26 for allowing unfiltered water U to be pumped from the reservoir 13 into the pump chamber 26, and a passageway 28 between the filter chamber 25 and pump chamber 26 for allowing unfiltered water U to be pumped from the pump chamber 26 to the filter chamber 25. The reservoir 13 for containing unfiltered water U is defined or formed by the portions of the hollow interior 23 surrounding the filter chamber 25, pump chamber 26, and passageway 28, etc. The body 21 preferably has a removable top 29 so that the top 29 can be removed from the remainder of the body 21 for allowing easy replacement of the filter 15, etc. The body 21 has a bottom 30. The body 21 preferably has an access port 31, preferably in the top 29, for allowing unfiltered water U to be easily poured or otherwise added to the reservoir 13. A lid or cap 33 is preferably provided for allowing the access port 31 to be closed when desired. Feet or pads 32 may be provided on the bottom 30 of the body 21 for allowing the canteen 11 to be sat stably on a table or other surface. The cap 33 may be secured to the body 21 by way of a flexible strap 35 or the like. The body 21 may include attachment points 37 for allowing a shoulder strap 39 to be attached thereto, and may be designed to be carried over a person's shoulder, etc. In such a case, the back side of the body 21 may be curved to comfortably rest against the person's hip or waist, etc. The size and shape of the body 21 can vary depending on the intended use of the canteen 11, etc. The body 21, spout 17, and associated parts (e.g., the walls within the interior 23 that form the filter and pump chambers 25, 26) may be molded or otherwise constructed out of plastic or the like as a multi-piece unit joined together in a liquid-tight manner using seals, O-rings, and the like (not shown) to produce a liquid tight unit. As shown in FIG. 6, the walls within the interior 23 forming the filter and pump chambers 25, 26 can be in the form of a first unitary structure and the removable top 26 and spout 17 can be in the form of a second unitary structure.

The filter 15 is preferably an off-the-shelf cartridge filter or the like, such as a Model ST, CERAMIKX® all carbon filter marketed by KX Industries, L.P., 269 South Lambert Rd., Orange, Conn. 06477-3502. However, various other standard, off-the-shelf filters can be used to remove various specific contaminants, etc., from the unfiltered water U, as will now be apparent to those skilled in the art, and the filter chamber 25 can be easily modified to work with any particular filter. Preferably, a screw 41 extends from the top 29 of the body 21 down through the center of the filter 15 and filter chamber 25 to a threaded receiver 43 on the bottom 30 of the body 21 to removably mount the filter 15 within the filter chamber 25 and to secure the top 29 of the body 21 to the bottom 30 of the body 21. Seals 45 such as protuberances, O-rings, etc., are provided for creating a fluid-tight seal between the exterior of the filter 15 and the interior 47 of the filter 15 form preventing water from passing into the interior 47 of the filter 15 except through the filter media of the filter 15, so that the only way unfiltered water U on the exterior of the filter 15 within the filter chamber 25 can pass into the interior 47 of the filter 15 is through the wall 49 of the filter 15 (i.e., through the filter media of the filter 15), where it will be filtered and/or purified, etc.

The spout 17 preferably has a passageway 51 formed in the top 29 of the body 21 of the canteen 11 in a position having a first or inlet end 53 communicating with the interior 47 of the filter 15 in the filter chamber 25, and having a second or outlet end 55 on the exterior of the canteen 11 so that filtered water F from the interior 47 of the filter 15 can be pumped into the passageway 51 through the inlet end 53 thereof, and out the passageway 51 through the outlet end 55 thereof. The spout 17 may be molded or otherwise constructed out of plastic or the like as a one-piece, integral unit with the top 29 of the body 21 of the canteen 11, or may be constructed as a multi-piece unit to allow the location of the outlet end 55 thereof to be moved and adjusted, etc.

The pump 19 may be of various specific types and constructions. Preferably, the pump 19 includes a piston 57 slidably positioned within the pump chamber 26 in close, substantially water tight contact with the inner walls of the pump chamber 26 so that up and down movement of the piston 57 will cause unfiltered water U to be respectively drawn into the pump chamber 26 from the reservoir 13 through the inlet passageway 27 and forced out of the pump chamber 26 through the passageway 28. The pump 19 preferably includes a piston rod 59 extending from the piston 57 upwardly through the top 29 of the body 21 to a cap or handle 61 to allow the user of the canteen 11 to manually move the piston 57 up and down in the pump chamber 26, to manually pump unfiltered water U from the reservoir 13 through the filter 15, and to manually pump filtered water F from the interior 47 of the filter 15 out the spout 17 when desired.

Figure 4:
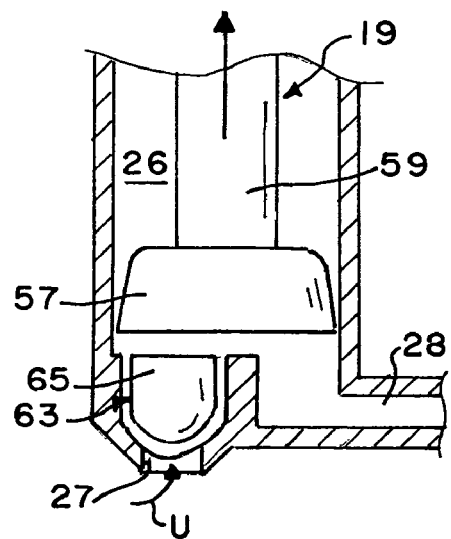
FIG. 4 is a sectional view of portions of the valve and pump mechanisms of the canteen of the present invention, showing the valve portions in an opened position and showing the pump portions in an intake mode.
Figure 5:
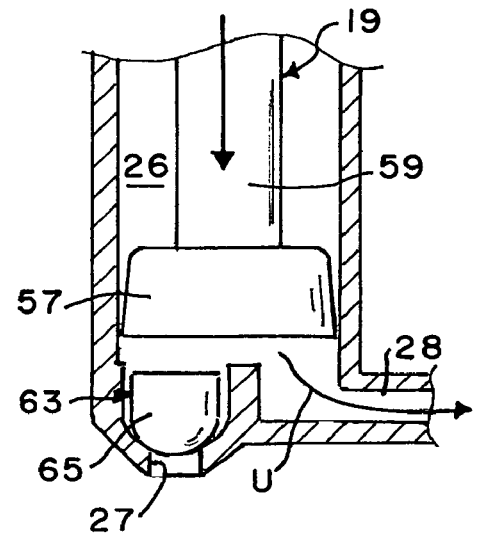
FIG. 5 is a sectional view similar to FIG. 4, but showing the valve portions in a closed position and showing the pump portions in a discharge mode.

The canteen 11 preferably includes a valve 63 for allowing unfiltered water U to be pulled into the pump chamber 26 from the reservoir 13 and for preventing unfiltered water U from being forced from the pump chamber 26 back into the reservoir 13. More specifically, the valve 63 opens the inlet passageway 27 as shown in FIG. 4 when unfiltered water U is pumped into the pump chamber 26 (i.e., when the piston 57 is moved up in the pump chamber 26 away from the inlet passageway 27) allowing unfiltered water U to be pulled into the pump chamber 26 from the reservoir 13 through the passageway 27, and closes the inlet passageway 27 when unfiltered water U is pumped out of the pump chamber 26 (i.e., when the piston 57 is moved down in the pump chamber 26 toward the inlet passageway 27) preventing unfiltered water U from being pushed from the pump chamber 26 back into the reservoir 13 through the passageway 27. The valve 63 may be constructed in various manners as will now be apparent to those skilled in the art. For example, the valve 63 may consist of a typical ball-valve, including a ball member 65 for being forced or pulled away from the inlet passageway 27 by the force of the unfiltered water U when the unfiltered water U is being pumped, or drawn, into the pump chamber 26 (see FIGS. 4 and 6), and for being forced against the inlet passageway 27 by the force of the unfiltered water U when the unfiltered water U is being pumped, or forced, out of the pump chamber 26 (see FIG. 5). The ball member 65 and the face or end of the inlet passageway 27 communicating with the pump chamber 26 is preferably complementary shaped so that a substantially liquid-tight seal is formed therebetween when the ball member 65 is forced against the inlet passageway 27 as shown in FIG. 5. The valve 63 may include various guides, pins, stops and the like (some not shown) for insuring proper movement of the ball member 65 relative to the inlet passageway 27, etc.

The use and operation of the canteen 11 is quite simple. First, the desired quantity of unfiltered water U from an initial or primary water source is added the reservoir 13 through the access port 31. The canteen 11 can then be carried by the strap 35, etc., during a hike, march, trip, etc., away from the initial or primary water source. Then, anytime filtered water F is desired, one need only to activate the pump 19 by moving the piston rod 59 up and down to cause the piston 57 to initially pull unfiltered water U from the reservoir 13 through the inlet passageway 27, pass the valve 63 and into the pump chamber 26 when the piston rod 59 is pulled up, and then to force unfiltered water U through the passageway 28, into the filter chamber 25, through the wall 49 of the filter 15, into the interior 47 of the filter 15 as filtered water F, and out the passageway 51 of the spout 17. The piston rod 59 is pumped up and down until the desired amount of unfiltered water U has been forced through the filter 15 and out the spout 17.

Although the present invention has been described and illustrated with respect to a preferred embodiment and a preferred use therefor, it is not to be so limited since modifications and changes can be made therein which are within the full intended scope of the invention.

The invention claimed is:

1. A canteen for holding unfiltered water and for discharging filtered water, said canteen comprising:
 (a) a reservoir for holding unfiltered water, said reservoir having a reservoir chamber and having an inlet port opening into said reservoir chamber for allowing unfiltered water to be poured into said reservoir chamber;
 (b) a first unitary structure defining a pump chamber and a filter chamber, said pump chamber and said filter chamber each having a top;
 (c) a valve for allowing unfiltered water to be pulled into said pump chamber from said reservoir and for preventing unfiltered water from being forced from said pump chamber into said reservoir;
 (d) a canteen body having a bottom and a threaded receiver fixed on said bottom;
 (e) a filter including a filter cartridge located within said filter chamber; said filter cartridge including filter media having a cylindrical filter media wall and a hollow interior for holding filtered water;
 (f) a second unitary structure forming a removable top and a spout, said spout communicating with said hollow interior of said filter media for allowing filtered water to be discharged from said canteen, said second unitary structure being removable from said canteen body with said first unitary structure being located between said removable top and said bottom of said canteen body, said removable top closing said tops of said pump and filter chambers and being separable therefrom;
 (g) a screw passing through said second unitary structure and through said hollow interior of said filter media and being threadedly engaged with said threaded receiver for holding said removable top to said canteen body and clamping said canteen body for defining said pump and filter chambers between said removable top and said bottom of said canteen body;
 (h) seals for preventing water from passing into said hollow interior of said filter media from said reservoir except through said cylindrical filter media wall; and (i) a pump for pumping water from said reservoir, through said filter, and then out said spout.

2. The canteen of claim 1 in which said valve includes a ball valve.

3. The canteen of claim 1 in which said pump includes a piston for being moved in a first direction to cause untreated water from said reservoir to be pulled through said valve into said pump chamber, and for being moved in a second direction to cause water from said pump chamber to be forced into said filter chamber, through said cylindrical filter media wall, into said hollow interior of said filter media, and out said spout as filtered water.

* * * * *